(12) United States Patent
Podhajecki

(10) Patent No.: US 6,179,474 B1
(45) Date of Patent: *Jan. 30, 2001

(54) HIGH CAPACITY ROLLER BEARING

(75) Inventor: Stephen T. Podhajecki, Norfolk, CT (US)

(73) Assignee: The Torrington Company, Torrington, CT (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/976,333

(22) Filed: Nov. 21, 1997

(51) Int. Cl.[7] .................................................. F16C 33/51

(52) U.S. Cl. ............................ 384/573; 384/572; 384/578

(58) Field of Search ..................................... 384/573, 578, 384/579, 551, 572

(56) References Cited

U.S. PATENT DOCUMENTS

| | | |
|---|---|---|
| 603,869 | 5/1898 | Bauer . |
| 681,793 | 9/1901 | Hutchison . |
| 1,609,618 | 12/1926 | Gallagher et al. . |
| 2,052,292 | 8/1936 | Hartmann . |
| 2,540,283 | 2/1951 | Parsons . |
| 3,362,762 | 1/1968 | Haller . |
| 5,660,485 | 8/1997 | Podhajecki . |

*Primary Examiner*—Lenard A. Footland
(74) *Attorney, Agent, or Firm*—John C. Bigler

(57) ABSTRACT

Two axially spaced retailer end rings have axially inwardly extending blades forming circumferentially spaced roller pockets. No rigid connection of the end rings is provided. Circumferentially spaced rollers are aligned parallel to the bearing axis between the end rings such that ends of the rollers are received within the roller pockets. Abutment means limits axially outward movement of the end rings. The blades of the end rings have retention surfaces retaining the rollers radially and extend axially inwardly, parallel to the bearing axis, such that skew of the rollers is limited.

7 Claims, 2 Drawing Sheets

HIGH CAPACITY ROLLER BEARING

BACKGROUND OF THE INVENTION

Figure 1:
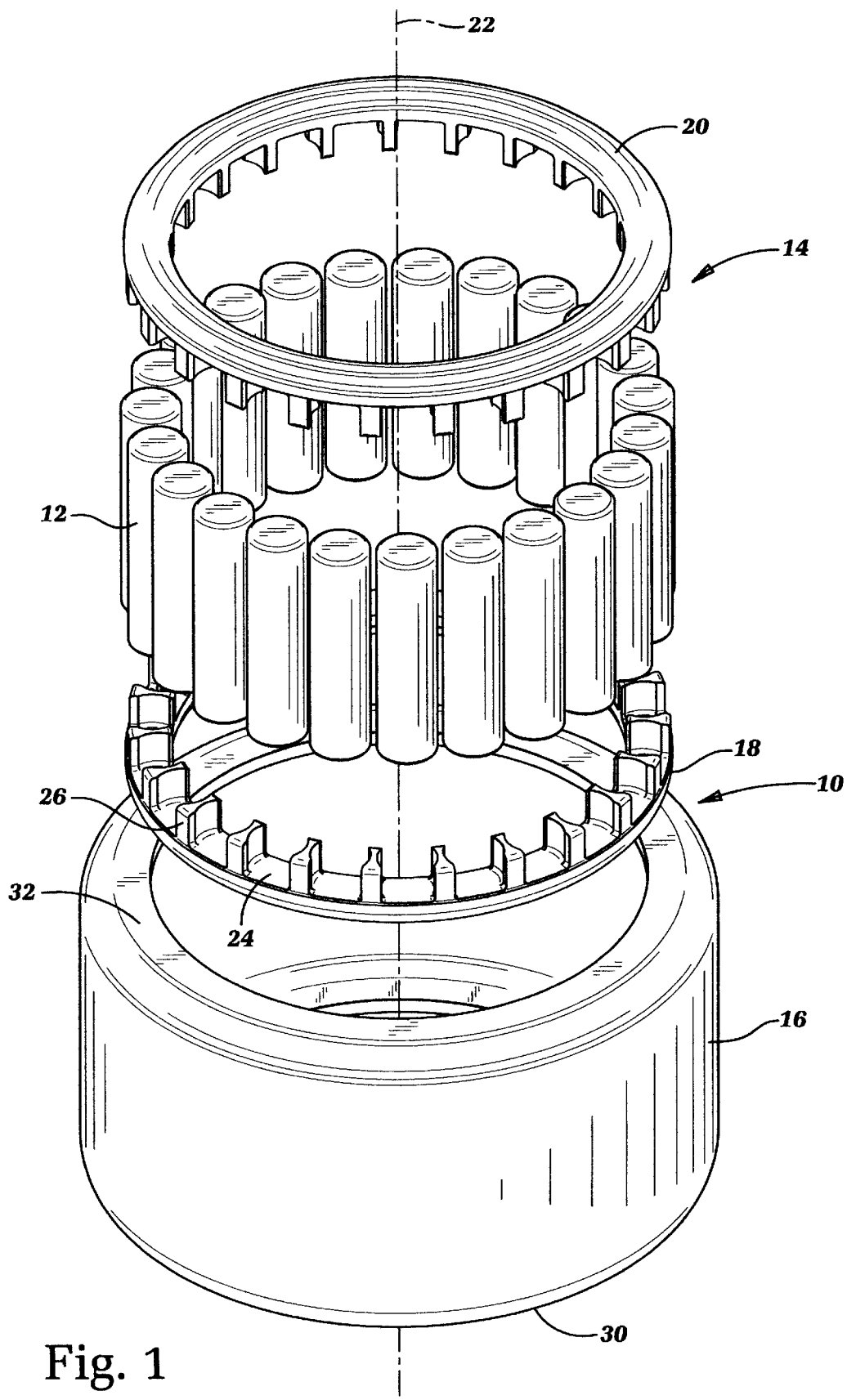

This invention relates generally to roller bearings and, more particularly, to a bearing retainer for use in high load capacity roller bearings.

Previously, bearing retainers have utilized end rims connected by crossbars to form a rigid structure having roller pockets. The crossbars provide circumferential separation and axial location of the rollers and maintain alignment of the rollers to prevent roller skew. Radial retention of the rollers is provided by tabs or other surfaces on the crossbars to retain the rollers in the radially inward and/or radially outward directions. However, such bearing retainers are difficult and expensive to manufacture and reduce the load capacity and lubrication of the bearing due to the space required for the crossbars.

To increase load capacity of the bearing, rollers with trunnion ends have been used, allowing the rollers to be positioned closely together as a full complement, without being separated by bearing retainer crossbars, allowing the rollers to rub against adjacent rollers. Radial retention of the rollers may be provided by engagement of the trunnions by a rolled lip of a drawn outer cup. However, such bearings have limited space for lubricant and are not suitable for high speed applications. In addition, trunnion configurations are difficult and expensive to manufacture.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a high capacity roller bearing comprising first and second retainer end rings spaced along an axis of the bearing, the end rings having axially inwardly extending blades forming circumferentially spaced roller pockets therebetween. No rigid connection of the end rings is provided. A plurality of circumferentially spaced rollers is aligned parallel to the bearing axis between the end rings such that ends of the rollers are received within the roller pockets. Abutment means engageable with the end rings limits axially outward movement of the end rings such that the ends of the rollers are maintained within the roller pockets. The blades of the end rings have retention surfaces extending circumferentially adjacent to the roller pockets such that the rollers are retained in at least one of the radially inward and radially outward directions and extend parallel to the bearing axis a sufficient length such that skew of the rollers is limited.

The foregoing and other aspects will become apparent from the following detailed description of the invention when considered in conjunction with the accompanying drawing figures.

BRIEF DESCRIPTION OF THE DRAWING FIGURES

Figure 2:
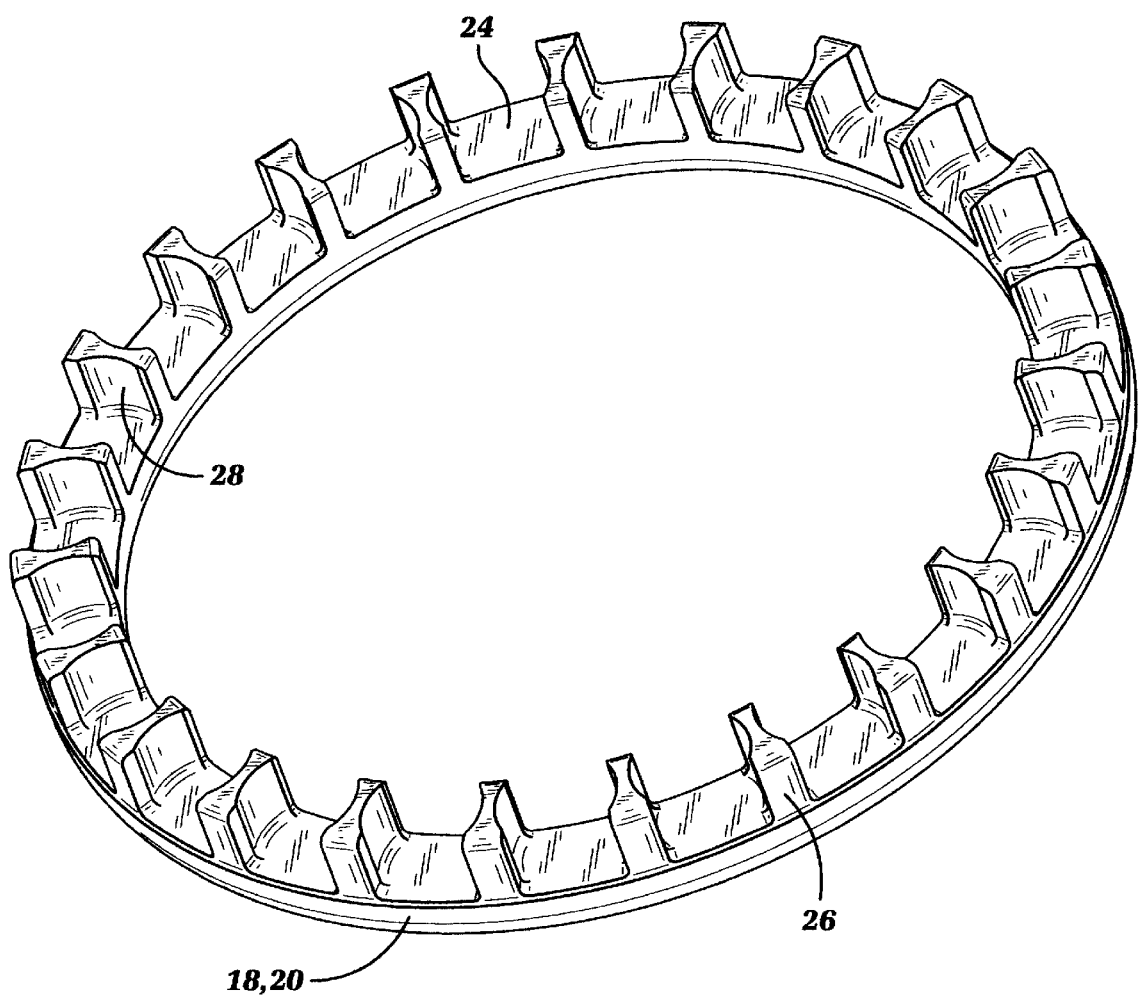

FIG. 1 is an exploded pictorial view of a roller bearing illustrating the present invention; and FIG. 2 is an enlarged pictorial view of an end ring of the bearing retainer of FIG. 1.

DETAILED DESCRIPTION

Referring now to the drawings, FIG. 1 illustrates roller bearing 10 comprising rollers 12, two-element bearing retainer 14, and drawn cup outer ring 16. The two elements comprising bearing retainer 14 are first and second end rings 18 and 20. Rollers 12 are aligned parallel to axis 22 of roller bearing 10 and are circumferentially spaced in roller pockets 24 formed by axially inwardly extending blades 26 of end rings 18 and 20.

As illustrated in FIG. 2, blades 26 are not flat separating devices but have retention surfaces 28 extending circumferentially at roller pockets 24 such that rollers 12 are retained in at least one of the radially inward and radially outward directions. In the embodiment shown, retention surfaces 28 are cylindrical, conforming to the configuration of rollers 12, providing a loose fit with the rollers, such that radial retention of rollers 12 is provided both inwardly and outwardly.

Assembly of roller bearing 10 may be accomplished by radially outward or radially inward snap fit installation of rollers 12 into bearing retainer 14 between end rings 18 and 20 or by axial insertion of rollers 12 into end rings 18 and 20, providing a subassembly of rollers and retainer in either manner. The subassembly may be inserted into a partially formed drawn cup outer bearing ring (cup with only one turned flange 30) that is subsequently processed to produce outer bearing ring 16 with second turned flange 32.

Since there is no interruption of rollers at their pitch line by a substantial retainer bar, as in conventional designs, rollers 12 can be positioned substantially closer together with this new design, thereby affording the opportunity to install a greater number of rollers to the bearing complement and achieve significant capacity gain.

Successful operation of this new design relies on the tendency of rollers to parallel align to shaft and housing centerline axes in the load bearing zone. During roller realignment, ends of the radially loaded rollers torque both retainers into axially mirrored registry. This registry then transfers to non-load zone rollers that are forced into shaft to housing axial registry through contact with their mated retainer projections. Preferably, rollers 12 are needle rollers and may have a length greater than four times their diameter.

Blades 26 of end rings 18 and 20 extend axially inwardly, parallel to bearing axis 22, a sufficient length (appearing as blade height in FIG. 2) such that skew of rollers 12 is limited. This feature allows rollers 12 to have rounded end configurations, for example elliptical or radiused, thereby avoiding corner stress and allowing a point contact with a flat surface provided at the bottom of roller pockets 24. This feature also ensures that rollers 12 will remain in place during handling prior to installation of roller bearing 10.

In the preferred embodiment illustrated, the two-element bearing retainer of the present invention is held axially against rollers 12 by flanges 30 and 32 of drawn outer bearing ring 16, and rollers 12 are to be installed over a shaft, not shown. The bearing retainer of the present invention may also be used with other bearing configurations with only an inner bearing ring or with both inner and outer bearing rings or between a housing and shaft. In such applications, other abutment means engageable with end rings 18 and 20 may be used in place of flanges 30 and 32 to limit axially outward movement of the end rings such that ends of rollers 12 are maintained within roller pockets 24.

This new roller bearing includes a plurality of rollers, a unique two-element retainer providing radial roller retention, axial roller location, and circumferential separation of the rollers. The retainer elements may be constructed of polymer, wide or narrow metal strip or coiled metallic materials and are generally thin rings with axial projections from one radial face, designed to loosely engage the roller ends and adjacent rollers with a controlled and minimal circumferential separation.

The present invention provides increased load capacity without the disadvantages of full complement configurations. The rollers are minimally separated from each other to prevent rubbing of adjacent rollers and provide increased lubrication relative to full complement bearings. As a result, such bearings are suitable for higher speed applications.

Having described the invention, what is claimed is:

1. A high capacity roller hearing comprising;

a two element hearing retainer comprising first and second end rings spaced along an axis of the bearing, the end rings having axially inwardly extending blades forming circumferentially spaced roller pockets therebetween;

the end rings being independent such that no rigid connection of the end rings is provided;

a plurality of circumferentially spaced rollers aligned parallel to the bearing axis and positioned between the end rings such that ends of the rollers are received within the roller pockets, the rollers having rounded ends engageable with the roller pockets of the end rings; and abutment means engageable with the end rings to limit axially outward movement of the end rings such that the ends of the rollers are maintained within the roller pockets;

the blades of the end rings having retention surfaces extending circumferentially adjacent to the roller pockets such that radially inward movement of the rollers is limited;

the blades of the end rings extending axially inwardly, parallel to the bearing axis, such that skew of the rollers is limited.

2. The high capacity bearing according to claim 1, wherein the rollers have a length greater than four times their diameter.

3. The high capacity bearing according to claim 1, wherein the roller ends are elliptical.

4. The high capacity bearing according to claim 1, further comprising a drawn cup outer ring providing an outer raceway for the rollers and wherein the abutment means engageable with the end rings comprises radially inwardly turned flanges of the drawn cup outer ring.

5. The high capacity bearing according to claim 1, wherein the retention surfaces of the blades extend circumferentially such that the rollers are retained in both radially inward and radially outward directions.

6. The high capacity bearing according to claim 5, wherein the retention surfaces are cylindrical, conforming to the configuration of the rollers.

7. The high capacity bearing according to claim 1, wherein the rollers have radiused corners between relatively flat end surfaces of the rollers and cylindrical side portions of the rollers.

\* \* \* \* \*